United States Patent
Shoda et al.

(10) Patent No.: US 12,509,558 B2
(45) Date of Patent: Dec. 30, 2025

(54) RUBBER COMPOSITION AND TIRE OBTAINED USING SAME

(71) Applicant: BRIDGESTONE CORPORATION, Tokyo (JP)

(72) Inventors: Yasuhiro Shoda, Tokyo (JP); Hideyuki Otsuka, Tokyo (JP); Daisuke Aoki, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 959 days.

(21) Appl. No.: 17/761,497

(22) PCT Filed: Sep. 11, 2020

(86) PCT No.: PCT/JP2020/034422
§ 371 (c)(1),
(2) Date: Mar. 17, 2022

(87) PCT Pub. No.: WO2021/054254
PCT Pub. Date: Mar. 25, 2021

(65) Prior Publication Data
US 2022/0372232 A1 Nov. 24, 2022

(30) Foreign Application Priority Data
Sep. 20, 2019 (JP) .................... 2019-171738

(51) Int. Cl.
| | |
|---|---|
| *C08G 18/73* | (2006.01) |
| *B60C 1/00* | (2006.01) |
| *C08G 18/24* | (2006.01) |
| *C08G 18/32* | (2006.01) |
| *C08G 18/65* | (2006.01) |
| *C08G 18/69* | (2006.01) |
| *C08G 81/02* | (2006.01) |

(52) U.S. Cl.
CPC .............. *C08G 81/024* (2013.01); *B60C 1/00* (2013.01); *C08G 18/246* (2013.01); *C08G 18/3206* (2013.01); *C08G 18/6588* (2013.01); *C08G 18/69* (2013.01); *C08G 18/73* (2013.01)

(58) Field of Classification Search
CPC .............. C08G 81/024; C08G 18/246; C08G 18/3206; C08G 18/6588; C08G 18/69; C08G 18/73; C08G 2261/42; C08G 18/74; C08G 18/76; C08G 61/00; B60C 1/00; C08F 297/00; C08F 299/00; C08L 9/00; C08L 75/14; C08L 87/005
See application file for complete search history.

(56) References Cited

U.S. PATENT DOCUMENTS

| | | |
|---|---|---|
| 4,463,156 A | 7/1984 | McGary, Jr. et al. |
| 2008/0027176 A1 | 1/2008 | Nishioka et al. |
| 2017/0044362 A1 | 2/2017 | Coupin |

FOREIGN PATENT DOCUMENTS

| | | | |
|---|---|---|---|
| CN | 1395588 A | 2/2003 | |
| CN | 106459569 A | 2/2017 | |
| EP | 1889735 A1 * | 2/2008 | ............ C08G 18/69 |
| EP | 3 895 904 A1 | 10/2021 | |
| JP | 58-165836 A | 9/1983 | |
| JP | 61-31420 A | 2/1986 | |
| JP | 2009-191100 A | 8/2009 | |
| JP | 2010536946 A * | 12/2010 | ............... C08F 8/30 |
| WO | 2019/118687 A1 | 6/2019 | |
| WO | WO-2020122174 A1 * | 6/2020 | ............... B60C 1/00 |

OTHER PUBLICATIONS

Ohishi (T. Ohishi et al., Metathesis-driven scrambling reactions between polybutadiene or naturally occurring polyisoprene and olefin-containing polyurethane, Polymer 78 (2015) 145-153).*
Extended European Search Report dated Oct. 21, 2022 in European Application No. 20865539.9.
Chinese Office Action issued Jan. 31, 2024 in Application No. 202080065282.7.
Tomoyuki Ohishi et al., "Supplementary Information for: Metathesis-driven Scrambling Reactions between Polybutadiene or Naturally Occurring Polyisoprene and Olefin-Containing Polyurethane", Polymer, Nov. 5, 2015, XP093050422, Retrieved from the Internet: URL:https://ars.els-cdn.com/content/image/1-s2.0-S0032386115302810-mmc1.docx (4 pages).
Tomoyuki Ohishi, et al., "Metathesis-driven scrambling reactions between polybutadiene or naturally occurring polyisoprene and olefin-containing polyurethane", Polymer, 2015, pp. 147-149, vol. 78, No. 5.
International Search Report for PCT/JP2020/034422 dated Nov. 24, 2020 [PCT/ISA/210].

* cited by examiner

Primary Examiner — Kumar R Bhushan
(74) Attorney, Agent, or Firm — Sughrue Mion, PLLC

(57) ABSTRACT

The present invention provides: a rubber composition having a good low heat generation property and is excellent in high elastic modulus and fracture resistance, and a tire using the rubber composition. The rubber composition contains a rubber component that contains a diene rubber, and the diene rubber contains a polymer (A) of a copolymer that has, in one molecule, a block moiety containing a urethane backbone segment and a block moiety containing a diene backbone segment.

19 Claims, No Drawings

RUBBER COMPOSITION AND TIRE OBTAINED USING SAME

CROSS REFERENCE TO RELATED APPLICATIONS

This application is a National Stage of International Application No. PCT/JP2020/034422 filed Sep. 11, 2020, claiming priority based on Japanese Patent Application No. 2019-171738 filed Sep. 20, 2019.

TECHNICAL FIELD

The present invention relates to a rubber composition excellent in low heat generation property, high elastic modulus and fracture resistance.

BACKGROUND ART

In order to improve various physical properties required for a tire, a technique for improving a rubber component has conventionally been studied. For example, PTL 1 proposes a technique of highly balancing the heat resistance, fracture strength, loss tangent (tan δ), and the like in the resulting rubber composition by modifying a terminal of a diene rubber.

However, when the technique disclosed in PTL 1 is applied to a tire, further improvement has been desired in the fracture resistance (e.g., crack growth resistance) of the tire although an excellent effect is achieved in the low hysteresis loss.

CITATION LIST

Patent Literature

PTL 1: JP 2009-191100 A

SUMMARY OF INVENTION

Technical Problem

However, when the technique disclosed in PTL 1 is applied to a tire, further improvement has been desired in the fracture resistance of the tire although an excellent effect is achieved in the low heat generation property.

An objective of the present invention is to provide a rubber composition excellent in improvement of low heat generation property and in high elastic modulus and fracture resistance, and a tire formed by using the rubber composition.

Solution to Problem

The present inventors have made intensive studies, and as a result, with a focus on a hydrogen bond which is one of noncovalent bonds, they have embodied high toughness by incorporating the hydrogen bond into a diene rubber material. They have found that when a polyurethane is incorporated in a polybutadiene backbone segment through a polymer reaction using a Grubbs 2nd generation catalyst, the high toughness is exhibited even in a rubber composition blended with compounding chemicals. Thus, they have found that the above problem can be solved by mixing a novel hydrogen bond-incorporated diene polymer, that is, a copolymer having a block moiety of a urethane backbone segment and a block moiety of a diene backbone segment in one molecule into a rubber composition.

In the present invention, the segment includes all of a monomer of a monomeric substance, an oligomer of a dimer or higher, and a polymer.

Specifically, the present invention relates to the following [1] to [11].

[1] A rubber composition containing a rubber component that contains a diene rubber, the diene rubber containing a polymer (A) of a copolymer that has, in one molecule, a block moiety containing a urethane backbone segment and a block moiety containing a diene backbone segment.

[2] The rubber composition according to [1], wherein the polymer (A) is contained in an amount of 2 to 100% by mass of the rubber component.

[3] The rubber composition according to [1] or [2], wherein the polymer (A) has a molar ratio of the urethane backbone to the diene backbone (urethane backbone/diene backbone) of (0.5/99.5) to (50/50).

[4] The rubber composition according to any one of [1] to [3], wherein the urethane backbone segment in the polymer (A) has a structure represented by the following formula 1:

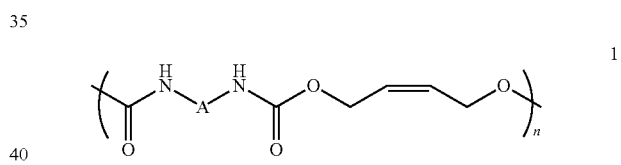

wherein A represents a hydrocarbon group which may have an element other than carbon and hydrogen, and n represents 10 to 500.

[5] The rubber composition according to any one of [1] to [4], wherein the diene backbone segment in the polymer (A) contains a conjugated diene.

[6] The rubber composition according to [5], wherein the diene backbone segment in the polymer (A) has a structure represented by the following formula 2:

wherein m represents 45 to 25000.

[7] The rubber composition according to any one of [1] to [6], wherein the polymer (A) has a structure represented by the following formula 3:

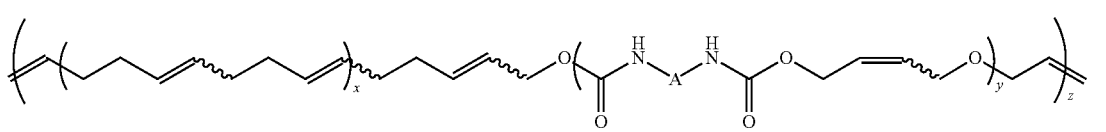

wherein A represents a hydrocarbon group which may have an element other than carbon and hydrogen, x represents 1 to 13500, y represents 1 to 250, z represents 1 to 250, and x and y are independent of each other for every segment.
[8] The rubber composition according to any one of [1] to [7], wherein the polymer (A) has a number average molecular weight Mn of 2000 to 1350000, a weight average molecular weight Mw of 2000 to 2300000, and a molecular weight distribution MWD of 1.0 to 2.4.
[9] The rubber composition according to any one of [1] to [8], wherein the diene rubber contains a polybutadiene rubber.
[10] The rubber composition according to any one of [1] to [9], wherein the polymer (A) is produced from a first step of synthesizing the urethane backbone segment, a second step of synthesizing the diene backbone segment, and a third step of forming the copolymer by a polymer scrambling reaction of the urethane backbone segment and the diene backbone segment, and wherein the degree of exchange in the polymer scrambling reaction is less than 80 mol %.
[11] A tire using the rubber composition according to any one of [1] to [10].

Advantageous Effects of Invention

According to the present invention, by incorporating the polymer (A) of a copolymer that contains a block moiety containing a urethane backbone segment and a block moiety containing a diene backbone segment in a rubber composition, the polyurethanes in the block moiety of a urethane backbone segment bond by hydrogen bonding, and the hydrogen bond does not break in a low strain region of the rubber composition after vulcanization to make the rubber composition maintain a low heat generation property, whereas the hydrogen bond breaks in a high strain region and energy dissipation occurs at the time of breakage to improve the fracture resistance of the rubber composition.

Further, by arranging the urethane backbone segments as blocks, the urethane hard segment enables high elastic modulus, therefore providing a rubber composition that has both good low heat generation property and good fracture resistance.

Namely, according to the present invention, there can be provided a rubber composition excellent in low heat generation property, high elastic modulus and fracture resistance, and a tire using the rubber composition.

DESCRIPTION OF EMBODIMENTS

[Rubber Composition]

The rubber composition of the present invention contains a rubber component that contains a diene rubber, and the diene rubber contains a polymer (A) of a copolymer that has, in one molecule, a block moiety containing a urethane backbone segment and a block moiety containing a diene backbone segment.

In the present invention, a hydrogen bond of a polyurethane is fused into a diene elastomer at the level of molecule to thus increase the fracture resistance (e.g., crack growth resistance) of a rubber composition. The hydrogen bond is weaker than the C—S and S—S bond, and thus is broken when subjected to a strain to cause energy dissipation. Accordingly, by designing the molecule not to be broken at a low strain which contributes to low heat generation property (fuel economy performance) but to be broken at a high strain in a rubber composition after vulcanization, both the low heat generation property and the crack growth resistance as fracture resistance can be considerably improved.

In the present invention, the tear strength is used to evaluate the crack growth resistance.

In the rubber composition of the present invention, the polymer (A) is preferably contained in an amount of 2 to 100% by mass of the rubber component from the viewpoint of the considerable increase in both the low heat generation property and the fracture resistance due to the urethane backbone segment, more preferably 5 to 100% by mass, further preferably 5 to 90% by mass, even further more preferably 5 to 80% by mass, even further more preferably 5 to 70% by mass, and particularly preferably 5 to 60% by mass.

[Polymer (A)]

The polymer (A) in the present invention is a copolymer that has, in one molecule, a block moiety containing a urethane backbone segment and a block moiety containing a diene backbone segment, and is a block copolymer.

In the present invention, the block copolymer means a copolymer having, in one molecule, a block moiety containing a urethane backbone segment and a block moiety containing a diene backbone segment. The block copolymer preferably has a degree of exchange in a polymer scrambling reaction of less than 80 mol %.

Here, the degree of exchange in a polymer scrambling reaction is evaluated according to the $^1$H NMR method described in a technical literature T. Ohishi et al., Polymer 78 (2015) 145-153.

More precisely, this is described with reference to the structures of the formula 1 and the formula 3 to be mentioned below. How many protons (a) bonding to the C—C double bond in a urethane backbone segment of the formula 1 are replaced with protons (B) bonding to the C—C double bond of the bonding moiety (the portion between the parenthesis surrounded by x in the formula 3 and the parenthesis surrounded by y in the formula 3) of the urethane backbone segment and the diene backbone segment (in the parenthesis surrounded by x in the formula 3), and from the resulting proportion, the degree of exchange in a polymer scrambling reaction is evaluated. When the proportion of B is large, the diene backbone segments and the urethane backbone segments bond alternately to each other as such to increase the randomness, whereas on the other hand, when the ratio of B is small, the diene backbone segments and the urethane backbone segments bond as blocks and the resultant structure is to be thereby likely a block structure.

More preferably, the degree of exchange in the polymer scrambling reaction is less than 70 mol %, even more preferably less than 60 mol %, further more preferably less than 50 mol %, particularly preferably less than 45 mol %.

When the degree of exchange in the polymer scrambling reaction is not less than 80 mol %, the randomness of the block configuration of the polymer (A) lowers so that the randomness thereof increases, which, however, is unfavorable. From the viewpoint of fracture characteristic, the degree of exchange is preferably 5 mol % or more.

Also preferably, in the polymer (A), the proportion of the urethane backbone segments is 0.5 mol % or more, more preferably 1 mol % or more, even more preferably 2 mol % or more, and further more preferably 5 mol % or more.

The urethane backbone segment as referred to herein means that how much proportion of urethane backbone segments individually bond to each other in series when the proportion of the urethane backbones in one molecule is 100 mol %. A larger mol % means that one segment has a longer urethane backbone chain.

When the proportion of non-urethane backbone segments is large, urethane may exist as blocks, and if so, the hysteresis loss in a low strain region tends to readily increase.

The molar ratio of the urethane backbone to the diene backbone (urethane backbone/diene backbone) is preferably (0.5/99.5) to (50/50) from the viewpoint of the balance between low heat generation property improvement, elastic modulus increase and fracture resistance enhancement by the urethane backbone and fuel economy performance due to deterioration of compatibility, more preferably (0.5/99.5) to (40/60), further preferably (1/99) to (30/70), and particularly preferably (2/98) to (20/80).

(Urethane Backbone Segment in Polymer (A))

The urethane backbone segment in the polymer (A) preferably has a structure represented by the following formula 1.

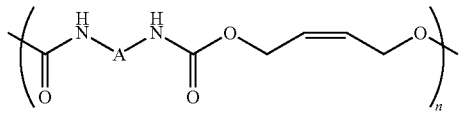

1

In the formula 1, A represents a hydrocarbon group which may have an element other than carbon and hydrogen, and n represents 10 to 500.

Here, n is preferably 100 to 500, more preferably 150 to 500, even more preferably 200 to 500, and particularly preferably 250 to 350.

Examples of the diisocyanate used for forming the urethane backbone segment in the polymer (A) include methylenediphenyl-4,4'-diisocyanate, trans-1,4-cyclohexane diisocyanate, dicyclohexylmethane-4,4'-diisocyanate, m-xylylene diisocyanate, polypropyleneglycol tolylene-2,4-diisocyanate, poly(hexamethylene diisocyanate, 1,8-diisocyanatooctane, hexamethylene diisocyanate, 1,4-diisocyanatobutane, 1,3-bis(1-isocyanato-1-methylethyl)benzene, 3,3'-dimethyl-4,4'-biphenylene diisocyanate, 4,4'-MDI[4,4'-methylenebis(phenyl isocyanate)], bis(4-isocyanatophenyl) methane, and isophorone diisocyanate.

As A in the formula 1, the following formulae 4 to 7 are exemplified.

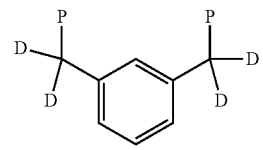

4

In the formula 4, P is a bonding point that bonds to a nitrogen atom adjacent to A via a single bond, D is a hydrogen atom or a hydrocarbon group having 1 to 20 carbon atoms, and plural D's may be the same as or different from one another.

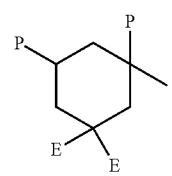

5

In the formula 5, P is a bonding point that bonds to a nitrogen atom adjacent to A via a single bond, E is a hydrogen atom or a hydrocarbon group having 1 to 20 carbon atoms, and plural E's may be the same as or different from each other.

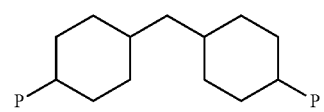

6

In the formula 6, P is a bonding point that bonds to a nitrogen atom adjacent to A via a single bond.

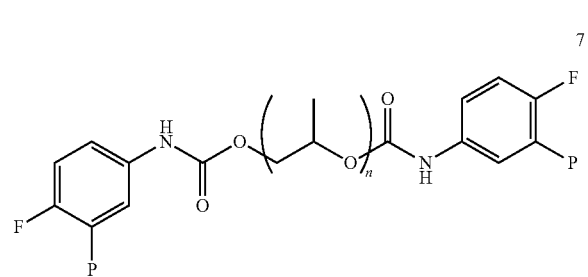

7

In the formula 7, n is preferably 1 to 32, more preferably 1 to 30, further preferably 1 to 20, and particularly preferably 1 to 5. P is a bonding point that bonds to a nitrogen atom adjacent to A via a single bond, F is a hydrogen atom or a hydrocarbon group having 1 to 20 carbon atoms, and plural F's may be the same as or different from each other.

As A, the formulae 4 to 6 have a larger amount of urethane bonds than the formula 7, and thus are superior to the formula 7 from the viewpoint of the increases in the crack growth resistance balance and fracture resistance due to the urethane backbone.

(Diene Backbone Segment in Polymer (A))

The diene backbone segment in the polymer (A) preferably contains a conjugated diene.

The conjugated diene preferably has 4 to 8 carbon atoms. Specific examples of the conjugated diene compound include 1,3-butadiene, isoprene, 1,3-pentadiene, and 2,3-dimethyl-1,3-butadiene. One of the conjugated diene compounds may be used alone or two or more thereof may be used in combination.

The diene backbone in the polymer (A) preferably has a structure represented by the following formula 2.

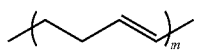
2

In the formula 2, m represents 45 to 25000.

Here, m is preferably 500 to 25000, more preferably 1000 to 25000, even more preferably 3000 to 25000, and particularly preferably 5000 to 25000.

The polymer (A) having the formula 1 and the formula 2 preferably has a structure represented by the following formula 3.

3

In the formula 3, A represents a hydrocarbon group which may have an element other than carbon and hydrogen, x represents 1 to 13500, y represents 1 to 250, z represents 1 to 250, and x and y are independent of each other for every segment.

Preferably, the number average molecular weight Mn of the polymer (A) is 2000 to 1350000, the weight average molecular weight Mw thereof is 2000 to 2300000, and the molecular weight distribution MWD thereof is 1.0 to 2.4.

More preferably, the number average molecular weight Mn of the polymer (A) is 2000 to 500000, even more preferably Mn is 2000 to 450000, and especially preferably Mn is 2000 to 400000. More preferably, the weight average molecular weight Mw of the polymer (A) is 2000 to 1000000, even more preferably Mw is 2000 to 900000, and particularly preferably Mw is 2000 to 800000. The molecular weight distribution MWD of the polymer (A) is more preferably 1.0 to 2.3, MWD is even more preferably 1.0 to 2.2, and MWD is particularly preferably 1.0 to 2.0. As the unit of the molecular weight in the present invention, kDa may be used. 1 kDa=1,000.

Regarding the microstructure of the conjugated diene backbone segment in the polymer (A), for example, in the case of cis-1,4-polybutadiene, the cis-1,4-bond content in the cis-1,4-polybutadiene is preferably 90% by mass or more, more preferably 92% by mass or more, further preferably 94% by mass or more, and particularly preferably 95% by mass or more.

On the other hand, in the case where a polybutadiene having an especially high 1,2-vinyl-bond content is used, the 1,2-vinyl-bond content is preferably 25% by mass or more, more preferably 40% by mass or more, further preferably 50% by mass or more, and particularly preferably 60% by mass or more.

Also on the other hand, in the case where a polybutadiene having an especially high 1,4-trans-bond content is used, the 1,4-trans-bond content is preferably 25% by mass or more, more preferably 40% by mass or more, further preferably 50% by mass or more, and particularly preferably 60% by mass or more.

In the present invention, the number average molecular weight Mn, weight average molecular weight Mw, and molecular weight distribution MWD of each polymer [including the polymer (A), the urethane backbone segment, the non-urethane backbone segment and the like] in terms of polystyrene are determined by gel permeation chromatography [GPC: HLC-8020 manufactured by Tosoh Corporation, column: GMH-XL manufactured by Tosoh Corporation (two columns are connected in series), detector: refractive index detector (RI)] based on monodisperse polystyrenes, and are taken as the number average molecular weight Mn, the weight average molecular weight Mw, and the molecular weight distribution MWD in the present invention.

(Method for Producing Polymer (A))

Preferably, the polymer (A) according to the present invention is produced from a first step of synthesizing the urethane backbone segment, a second step of synthesizing the diene backbone segment, and a third step of forming the copolymer by a polymer scrambling reaction of the urethane backbone segment and the diene backbone segment, and the degree of exchange in the polymer scrambling reaction is less than 80 mol %.

For example, as described below, a cis-olefin-containing polyurethane (cis-PU) which is to be a urethane backbone segment is synthesized in the first step, then a cis-1,4-polybutadiene (PBD) which is to be a diene backbone segment is produced in the second step, and thereafter in the third step, the cis-PU to be a urethane backbone segment and the PBD to be a diene backbone segment are reacted in a polymer scrambling reaction to give a PBD/PU copolymer (polybutadiene/cis-olefin-containing polyurethane copolymer).

First Step [Synthesis of Cis-Olefin-Containing Polyurethane (Cis-PU)]

For example, an appropriate amount of dry DMF (N,N-dimethylformamide) is added to the respective appropriate amounts of trimethyl-1,6-diisocyanatohexane and cis-butene-1,4-diol, and the components are mixed in a round bottom flask. An appropriate amount of DBTDL (dibutyltin dilaurate) is added thereto with stirring at room temperature (23° C.), and the reaction mixture is stirred at 40° C. for 48 hours. Then, methanol is added to stop the reaction, and the mixture is poured into water with vigorous stirring. The precipitated polymer is collected and is dried in vacuum to obtain a cis-PU (cis-olefin-containing polyurethane).

Second Step [Synthesis of Cis-1,4-Polybutadiene (PBD)]

To a 1-liter glass reactor fully dried, 416 g of a hexane solution containing 50 g (0.93 mol) of 1,3-butadiene (conjugated diene monomer) is added. On the other hand, in a glove box in a nitrogen atmosphere, 100 mmol of trisbistrimethylsilylamide gadolinium (Gd[N(SiMe₃)₂]₃) (component (A)), 200 mmol of 3-benzylindene (component (B)), and 5 mmol of diisobutylaluminum hydride (component (C)) are added to a glass container, and these are dissolved in 10 mL of hexane.

After that, to the glass container, MMAO (trade name, MMAO-3A, by Tosoh Finechem Corporation) (component (D)) is added in such a manner that the molar proportion of aluminum in MMAO to gadolinium in trisbistrimethylsilylamide gadolinium is 500, and further 200 μmol of diethylaluminum chloride (component (E-1)) was added thereto to give a polymerization catalyst composition.

Subsequently, the polymerization catalyst composition is taken out of the glove box, and the polymerization catalyst composition in an amount that contains 3.9 mmol of gadolinium is added to a 2-L reactor containing 1,3-butadiene. The reaction system is kept at 60° C. for 60 minutes to polymerize 1,3-butadiene. Subsequently, 5 mL of an isopropanol solution (5% by mass) of 2,2'-methylene-bis(6-t-butyl-4-ethylphenol) (trade name, Nocrac NS-5, by Ouchi Shinko Chemical Industrial Co., Ltd.) is added to the reaction system to stop the polymerization reaction. Further, a large amount of methanol is added to the reactor to precipitate and separate the reaction product, and then dried in vacuum at 60° C. to give a polymer.

Not carrying out the synthesis in the second step, a commercial product, cis-1,4-polybutadiene can also be used.

Third Step [Polymer Scrambling Reaction by Olefin Cross-Metathesis Reaction]

In a Schlenk flask filled with nitrogen, a Grubbs 2nd generation catalyst as described later (0.1 mol % of the total number of the double bond units in the polymer main chain) is added to, for example, a solution of equal amounts of the cis-1,4-polybutadiene (PBD) and the cis-olefin-containing polyurethane (cis-PU) in dry $CH_2Cl_2$ (a polymer concentration: 70 mol %), and the mixture is deaerated through three cycles of freezing-thawing. Subsequently, the mixture is stirred at ambient temperature for 3 hours, then an excess amount of ethyl vinyl ether is added thereto for quenching, and the mixture is stirred at a room temperature (23° C.). After stirring the mixture for 1 hour, a solution of THP (tetrahydropyran) and triethylamine in a solvent mixture of methanol and $CH_2Cl_2$ [(methanol/$CH_2Cl_2$) volume ratio (v/v)=1/1] is added thereto and the residue is removed. After removing the solvent under reduced pressure, the residue is dissolved again in a small amount of $CH_2Cl_2$, and the mixture is poured into a water/methanol mixed liquid [(water/methanol) volume ratio (v/v)=3/1] with vigorous stirring. The precipitated polymer is collected and is dried in vacuum to obtain a PBD/cis-PU copolymer.

(Grubbs 2nd Generation Catalyst)

The Grubbs 2nd generation catalyst (2nd generation Grubbs catalyst) used in the present invention is benzylidene {1,3-bis(2,4,6-trimethylphenyl)-2-imidazolidinylidene} dichloro(tricyclohexylphosphine) ruthenium ($C_{46}H_{65}Cl_2N_2PRu$, molecular weight: 848.97, CAS registry number: [246047-72-3]), and was purchased from Sigma-Aldrich Inc. The chemical structure formula is shown below as the formula 10 for reference.

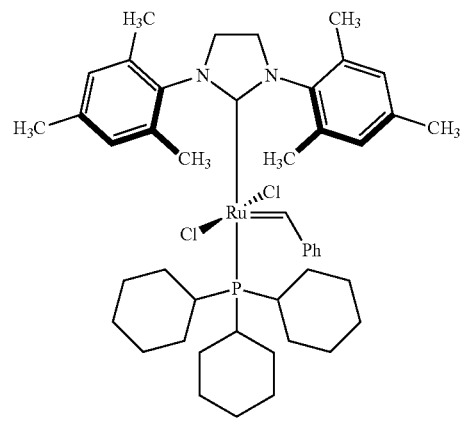

Examples of the diene rubber in the rubber component in the rubber composition of the present invention include a natural rubber (NR), a polybutadiene rubber (BR), a synthetic polyisoprene rubber (IR), and a styrene-butadiene rubber (SBR), and a polybutadiene rubber is preferably contained.

In production of the polybutadiene rubber, either of a solution polymerization method or an emulsion polymerization method may be used. In a solution polymerization method, a gadolinium metallocene complex catalyst, a nickel-based catalyst, a cobalt-based catalyst, a titanium-based catalyst, or an alkyllithium catalyst is used, and the microstructure is varied depending on the type of the catalyst. An example of a polybutadiene rubber produced by using a nickel-based catalyst is BR01 (cis-1,4-bond content: 95 wt %) manufactured by JSR Corporation, and examples of polybutadiene rubbers produced by using a cobalt-based catalyst include UBEPOL BR 150 (cis-1,4-bond content: 98 wt %), 150B (cis-1,4-bond content: 97 wt %), 150 L (cis-1,4-bond content: 98 wt %) manufactured by UBE INDUSTRIES LTD.

Examples of polybutadiene rubbers having a relatively high 1,2-vinyl bond content include Ricon 130 (1,2-vinyl-bond content: 28 wt %) and Ricon 142 (1,2-vinyl-bond content: 55 wt %) manufactured by Cray Valley, and examples of polybutadiene rubbers having an especially high 1,2-vinyl-bond content include Ricon 150 (1,2-vinyl-bond content: 70 wt %) and Ricon 152 (1,2-vinyl-bond content: 80 wt %).

[Rubber Component]

Examples of diene rubber components, other than the polymer (A), mixed in the rubber composition of the present invention include a natural rubber, an epoxidated natural rubber, a butadiene rubber of any kind, a styrene-butadiene copolymer rubber of any kind, an isoprene rubber, a butyl rubber, an acrylonitrile butadiene rubber, a chloroprene rubber, an ethylene-propylene-diene copolymer rubber, and a styrene-isoprene copolymer rubber. One of the diene rubber components may be used alone or two or more thereof may be used in combination.

[Filler]

The rubber composition of the present invention may contain a filler, in particular, a reinforcing filler, as required.

Suitable examples of the reinforcing filler according to the present invention include one or more reinforcing fillers selected from the group consisting of a carbon black and a silica. Besides the above, examples of the filler also include a clay, calcium carbonate, and aluminum hydroxide.

(Carbon Black)

The carbon black that is suitably mixed in the rubber composition of the present invention preferably has a nitrogen adsorption specific surface area ($N_2SA$) of 20 $m^2/g$ or more and 200 $m^2/g$ or less, more preferably 30 $m^2/g$ or more and 160 $m^2/g$ or less, further preferably 35 $m^2/g$ or more and 100 $m^2/g$ or less, and particularly preferably 40 $m^2/g$ or more and 100 $m^2/g$ or less.

Here, the nitrogen adsorption specific surface area ($N_2SA$) of a carbon black can be measured according to JIS K 6217-2:2001.

The carbon black mixed in the rubber composition of the present invention preferably has a DBP (dibutyl phthalate) oil absorption of 50 ml/100 g or more and 135 ml/100 g or less, more preferably 55 ml/100 g or more and 130 ml/100 g or less, further preferably 60 ml/100 g or more and 130 ml/100 g or less, and particularly preferably 65 ml/100 g or more and 125 ml/100 g or less.

Here, the DBP oil absorption can be measured according to JIS K 6217-4:2008.

The content of the carbon black based on 100 parts by mass of the rubber component is preferably 20 to 150 parts by mass. With a carbon black content of 20 parts by mass or more, the crack growth resistance of the rubber composition can be increased more, and with a carbon black content of 150 parts by mass or less, the workability of the rubber composition is less likely to be impaired. The carbon black content based on 100 parts by mass of the rubber component is more preferably 20 to 100 parts by mass, further preferably 30 to 80 parts by mass, and particularly preferably 30 to 60 parts by mass.

(Silica)

The type of the silica suitably mixed in the rubber composition of the present invention is not particularly limited, and any silica, from a general grade silica to a surface-treated specific silica, can be used according to the use purpose, and examples thereof include a wet method silica (hydrated silicic acid), a dry method silica (anhydrous silicic acid), calcium silicate, and aluminum silicate. One of the silicas may be used alone or two or more thereof may be used in combination.

Among them, as a silica (B), a wet method silica is preferably used in that the workability of the rubber composition and the crack growth resistance of a tire are increased.

(Other Compounding Ingredient)

As other compounding ingredients mixed in the rubber composition of the present invention, any compounding ingredient may be appropriately selected and used to the extent that the objective of the present invention is not impaired, and examples thereof include an inorganic filler other than the fillers mentioned above, a vulcanizer such as sulfur, a vulcanization accelerator such as dibenzothiazyl disulfide, N-cyclohexyl-2-benzothiazyl-sulfenamide, or N-oxydiethylene-benzothiazyl-sulfenamide, a vulcanization accelerator aid such as zinc oxide or stearic acid, a heat resistant crosslinker, an antioxidant such as N-phenyl-N'-(1,3-dimethylbutyl)-p-phenylenediamine, a sunlight crack resistant, a colorant, a rubber flexibility improver, a softening agent, a resin, a coupling agent, and other additives, and a compounding ingredient of any kind generally used in the rubber industry. As the compounding ingredients, commercially available products can be suitably used.

As the sunlight crack resistant, a wax such as microcrystalline wax is mixed, and examples thereof include trade name "Sunnock" and "Ozonock" manufactured by Ouchi Shinko Chemical Industrial Co., Ltd.; trade name "Suntight" manufactured by Seiko Chemical Co., Ltd.; and trade name "Ozogard G" manufactured by Kawaguchi Chemical Industry Co., Ltd., and "Vanwax-H Special"

An example of the heat resistant crosslinker is N,N'-diphenylmethane bismaleimide (hereinafter abbreviated as "BMI"), which can provide a crosslinking structure that is thermally stabler than by a crosslinking with sulfur.

As the rubber flexibility improver, a dicyclopentadiene (DCP) resin is suitably used, and examples thereof include "Quintone 1105" manufactured by Zeon Corporation and trade name "Marcarets M" series (M-890A, M-845A, M-990A, etc.) manufactured by MARUZEN PETROCHEMICAL CO., LTD.

[Preparation of Rubber Composition and Production of Pneumatic Tire]

The rubber composition according to the present invention is obtained by performing a master batch kneading step using a kneader such as a Banbury mixer, a roll, or an internal mixer, according to various formulations, in which a vulcanizer, a vulcanization accelerator, a heat resistant crosslinker, and a vulcanization accelerator aid are not mixed, and then performing a final kneading step in which a vulcanizer, a vulcanization accelerator, a heat resistant crosslinker, and a vulcanization accelerator aid are mixed. The rubber composition is subjected to molding and vulcanization before used as various members of a tire, in particular, a pneumatic tire.

[Applications Other than for Tire]

The rubber composition of the present invention is suitably used in applications other than for a tire, for example, for various members such as a vibration proof rubber, a vibration isolation rubber, a crawler, a belt, and a hose.

EXAMPLES

The present invention will be described in more detail below with reference to examples, but the present invention is in no way limited to the following examples.

Production Example 1 [Synthesis of PBD/Cis-PU Copolymer I (PB-PU I)]

First Step [Synthesis of Cis-Olefin-Containing Polyurethane (Cis-PU)]

A compound of the formula 3 having A represented by the formula 6 (21 mL, 85.6 mmol), cis-butene-1,4-diol (7 mL, 85.6 mmol), and dry DMF (N,N-dimethylformamide) (150 mL) were mixed in a round bottom flask, DBTDL (dibutyltin dilaurate) (0.17 mL, 0.283 mmol) was added thereto with stirring at room temperature (23° C.), and then the reaction mixture was stirred at room temperature (23° C.) for 72 hours. Subsequently, methanol was added to stop the reaction, and the mixture was poured into water with vigorous stirring. The precipitated polymer was collected and was dried in vacuum to give 28.2 g (94% by mass) of a cis-PU.

Second Step [Synthesis of Cis-1,4-Polybutadiene (PBD)]

To a 1-liter glass reactor fully dried, 416 g of a hexane solution containing 50 g (0.93 mol) of 1,3-butadiene (conjugated diene monomer) was added. On the other hand, in a glove box in a nitrogen atmosphere, 100 mmol of trisbistrimethylsilylamide gadolinium ($Gd[N(SiMe_3)_2]_3$) (component (A)), 200 mmol of 3-benzylindene (component (B)), and 5 mmol of diisobutylaluminum hydride (component (C)) were added to a glass container, and these were dissolved in 10 mL of hexane.

After that, to the glass container, MMAO (trade name, MMAO-3A, by Tosoh Finechem Corporation) (component (D)) was added in such a manner that the molar proportion of aluminum in MMAO to gadolinium in trisbistrimethylsilylamide gadolinium could be 500, and further 200 µmol of diethylaluminum chloride (component (E-1)) was added thereto to give a polymerization catalyst composition.

Subsequently, the polymerization catalyst composition was taken out of the glove box, and the polymerization catalyst composition in an amount containing 3.9 mmol of gadolinium was added to a 2-L reactor containing 1,3-butadiene. The reaction system was kept at 60° C. for 60 minutes to polymerize 1,3-butadiene. Subsequently, 5 mL of an isopropanol solution (5% by mass) of 2,2'-methylene-bis (6-t-butyl-4-ethylphenol) (trade name, Nocrac NS-5, by Ouchi Shinko Chemical Industrial Co., Ltd.) was added to the reaction system to stop the polymerization reaction. Further, a large amount of methanol was added to the reactor to precipitate and separate the reaction product, and then dried in vacuum at 60° C. to give a polymer. (Yield: 44 g).

Third Step [Polymer Scrambling Reaction by Olefin Cross-Metathesis Reaction]

In a Schlenk flask filled with nitrogen, a Grubbs 2nd generation catalyst as described above (92.9 mg, 110 µmol, 0.1 mol % of the total number of double bond units in the polymer main chain) was added to a dewatered THF (tetrahydrofuran: polymer concentration 70 mol %) solution of 0.2 mol % of cis-1,4-polybutadiene (PBD) obtained in the step 2 and 0.02 mol % of cis-olefin-containing polyurethane (cis-PU). Subsequently, the mixture was stirred at room temperature (23° C.) for 3 hours, then an excess amount of ethyl vinyl ether was added thereto and the mixture was stirred at room temperature (23° C.) for quenching (rapidly cooling). A mixed solution of methanol and $CH_2Cl_2$ [(methanol/$CH_2Cl_2$) volume ratio (v/v)=1/1], THP (tetrahydropyran: 0.68 g, 5.48 mmol), and triethylamine (1.52 ml, 10.9 mmol) was added thereto and the solvent was partially removed under reduced pressure, and then, the mixture was poured into a water/methanol mixed liquid [(water/methanol) volume ratio (v/v)=3/1] with vigorous stirring. The precipitated polymer was collected and was dried in vacuum to obtain a PBD/cis-PU copolymer I [molar ratio (urethane backbone/diene backbone): 9/91]. Mn was 18,000, Mw was 25,000 and MWD (Mw/Mn) was 1.4.

The degree of change in the polymer scrambling reaction was 35 mol %.

The number average molecular weight Mn, the weight average molecular weight Mw and the molecular weight distribution MWD were calculated according to the above-mentioned GPC method.

The urethane unit (mol/100 g) was calculated from the charged amounts in Production Example 1.

The degree of exchange (mol %) in the polymer scrambling reaction was calculated according to the above-mentioned $^1$H NMR method. The $^1$H NMR method is a method of calculation from the integration ratio of the $^1$H NMR peaks of cis-PU before and after metathesis reaction in the third step.

The polymer (A) was produced from the first step of synthesizing the urethane backbone segment, the second step of synthesizing the diene backbone segment, and the third step of producing the copolymer by the polymer scrambling reaction of the urethane backbone segment and the diene backbone segment, and the degree of exchange in the polymer scrambling reaction was less than 80 mol %.

Example 1 and Comparative Examples 1 to 3

Four rubber compositions were prepared according to the formulations shown in Table 1. As instructed in Table 1, the master batch kneading step was performed in a Banbury mixer at the highest temperature of 160° C., and then the final kneading step was performed at the highest temperature of 110° C. to thus obtain the four rubber compositions.

The rubber compositions were evaluated according to the following evaluation methods.

Tensile Test

According to JIS K 6251:2010 "vulcanized rubber and thermoplastic rubber—method of determining tensile characteristics", a No. 3 dumbbell test piece was prepared and the elongation at break (Eb, unit: %), the tensile strength (TS, unit: MPa), the toughness (TF, unit: $10^{-6}$ J/m$^3$), the 25% elongation tensile stress (M25, unit: MPa) and the 50% elongation tensile stress (M50, unit: MPa) were measured at room temperature (23° C.) and a tensile speed of 500 mm/min.

For all the evaluation items, the data were indicated in exponent notation according to the following formula, based on the value in Example 2 as 100.

Index of evaluation item={(value in Example 1, Comparative Example 1 or Comparative Example 3)/(value in Comparative Example 2)}×100

Larger values mean better tensile characteristics.

Dynamic Viscoelasticity Test

The dynamic tensile storage modulus at a dynamic strain of 6% (6% E', unit: MPa) and the dynamic tensile loss modulus at a dynamic strain of 6% (6% tan δ) were measured using Eplexor 25 N to 500 N manufactured by NETZSCH-Gerätebau GmbH, at 23° C., an initial strain of 20%, a dynamic strain of 6%, and a frequency of 10 Hz.

The evaluation results were indicated in exponent notation according to the following formula.

Index of 6% E'={(value in Example 1, Comparative Example 1 or Comparative Example 3)/(value in Comparative Example 2)}×100

Index of 6% tan δ={(6% tan δ in Comparative Example 2)/(6% tan δ in Example 1, Comparative Example 1 or Comparative Example 3)}×100

A higher index of 6% E' indicates a higher value of 6% E.

A higher index of 6% tan δ indicates a smaller value of 6% tan δ and indicates a better low heat generation property.

Fracture Resistance

Using a trousers-shaped test piece, the tear strength (unit: kN/m) thereof was measured using a tensile tester (Shimadzu Corporation) according to JIS K6252-1:2015.

Index of tear strength={(tear strength in Example 1, Comparative Example 1 or Comparative Example 3)/(tear strength in Comparative Example 2)}×100

A higher index of tear strength indicates a higher tear strength and indicates better fracture resistance.

TABLE 1

|  |  |  | Example | Comparative Example | | |
|---|---|---|---|---|---|---|
|  |  |  | 1 | 1 | 2 | 3 |
| Compounding Formulation unit: part by mass | Master batch kneading step | Polybutadiene *1 | 90 | 100 | 90 | 90 |
|  |  | Liquid polybutadiene *2 | 0 | 0 | 10 | 10 |
|  |  | PB-PU *3 | 10 | 0 | 0 | 0 |
|  |  | Stearic acid *4 | 2 | 2 | 2 | 2 |
|  |  | Antioxidant 6C *5 | 1 | 1 | 1 | 1 |
|  | Final kneading step | Dicumyl peroxide *6 | 4.8 | 6 | 6 | 4.8 |
|  |  | Bismaleimide *7 | 1.6 | 2 | 2 | 1.6 |
|  |  | Zinc oxide *8 | 2.5 | 2.5 | 2.5 | 2.5 |
| Characteristics of PB-PU |  | Mn (unit: kDa) | 18 | — | — | — |
|  |  | Mw (unit: kDa) | 25 | — | — | — |
|  |  | Molecular weight distribution (MWD) | 1.4 | — | — | — |
|  |  | Butadiene backbone (unit: mol %) | 91 | — | — | — |
|  |  | Urethane backbone (unit: mol %) | 9 | — | — | — |
|  |  | Urethane unit (unit: mol/100 g) | 0.22 | 0 | 0 | 0 |
|  |  | Degree of exchange in polymer scrambling reaction (unit: mol %) | 35 | — | — | — |
| Physical properties after vulcanization | Tensile test (room temperature: 23° C.) | Elongation at break ($E_b$) | 128 | 112 | 100 | 175 |
|  |  | Tensile strength (TS) | 138 | 87 | 100 | 108 |
|  |  | Toughness (TF) | 146 | 63 | 100 | 192 |
|  |  | 25% elongation tensile stress | 123 | 106 | 100 | 74 |
|  |  | 50% elongation tensile stress | 118 | 108 | 100 | 72 |
|  | Dynamic viscoelasticity test (23° C., 10 Hz) | 6% E' | 128 | 165 | 100 | 81 |
|  |  | 6% tanδ | 161 | 44 | 100 | 111 |
|  | Fracture resistance | Tear strength | 136 | 67 | 100 | 119 |

Details of the raw materials in Table 1 are shown below.
*1 Cis-1,4-polybutadiene (PBD) obtained in the second step.
*2: Liquid polybutadiene Ricon 130 (1,2-vinyl bond: 28 wt %, Mn: 2500), manufactured by CRAY VALLEY.
*3: PB-PU: it is PBD/cis-PU copolymer produced in Production Example 1.
*4: Stearic acid: trade name "Stearic Acid 50S", manufactured by New Japan Chemical Co., Ltd.
*5' Antioxidant 6C: N-phenyl-N'-(l,3-dimethylbutyl)-p-phenylenediamine, trade name "Nocrac 6C", manufactured by Ouchi Shinko Chemical Industries Co., Ltd.
*6: Dicumyl peroxide DCP 40% (talc 60%), trade name "Percumyl D-40", manufactured by NOF Corporation. The blending amount shown in Table 1 is a blending amount of "Percumyl D-40".
*7: Bismaleimide: N,N'-m-phenylene bismaleimide, trade name "Sanfel BM" manufactured by Sanshin Chemical Industry Co., Ltd.
*8: Zinc oxide: manufactured by Sakai Chemical Industry Co., Ltd.

As is apparent from the results in Table 1, the rubber compositions in which PB-PU was mixed had a high elastic modulus and a good low heat generation property and were excellent in fracture resistance, as compared with the rubber compositions in which no PB-PU was mixed.

INDUSTRIAL APPLICABILITY

The rubber composition of the present invention has a high elastic modulus and a good low heat generation property and is excellent in fracture resistance, and thus is suitably used as various members such as, for example, a side wall, a belt coating rubber, and a ply coating rubber, of a pneumatic tire.

In addition, the rubber composition of the present invention is suitably used for applications other than for a tire, for example, as various members such as a vibration proof rubber, a vibration isolation rubber, a crawler, a belt, and a hose.

The invention claimed is:

1. A rubber composition comprising a rubber component that contains a diene rubber, wherein the diene rubber contains a polymer (A) of a copolymer that has, in one molecule, a block moiety containing a urethane backbone segment and a block moiety containing a diene backbone segment, wherein the urethane backbone segment in the polymer (A) has a structure represented by the following formula 1:

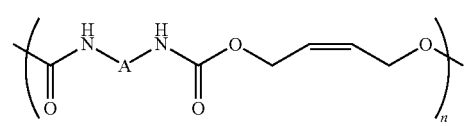

wherein A represents any one of formulas 4 to 7, and n represents 10 to 500,

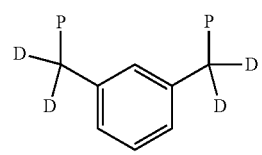

wherein in formula 4, P is a bonding point that bonds to a nitrogen atom adjacent to A via a single bond, D is a hydrogen atom or a hydrocarbon group having 1 to 20 carbon atoms, and plural D's may be the same as or different from one another,

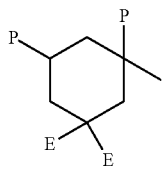

wherein m represents 45 to 25000.

6. The rubber composition according to claim 1, wherein the polymer (A) has a structure represented by the following formula 3:

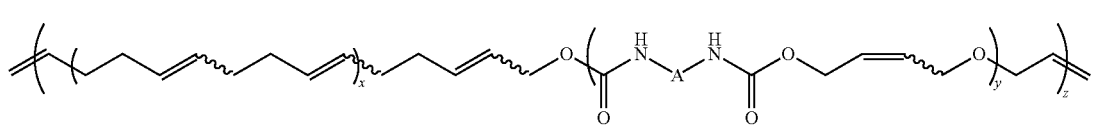

wherein in formula 5, P is a bonding point that bonds to a nitrogen atom adjacent to A via a single bond, E is a hydrogen atom or a hydrocarbon group having 1 to 20 carbon atoms, and plural E's may be the same as or different from each other,

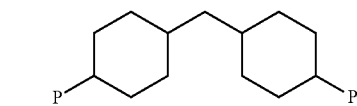

wherein in formula 6, P is a bonding point that bonds to a nitrogen atom adjacent to A via a single bond, and

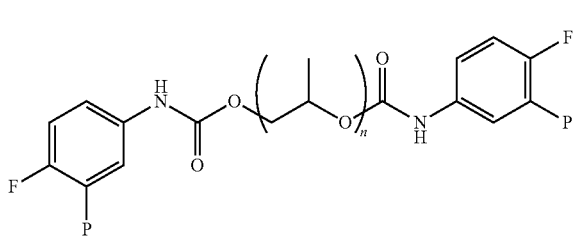

wherein in formula 7, n is 1 to 32, P is a bonding point that bonds to a nitrogen atom adjacent to A via a single bond, F is a hydrogen atom or a hydrocarbon group having 1 to 20 carbon atoms, and plural F's may be the same as or different from each other.

2. The rubber composition according to claim 1, wherein the polymer (A) is contained in an amount of 2 to 100% by mass of the rubber component.

3. The rubber composition according to claim 1, wherein the polymer (A) has a molar ratio of the urethane backbone to the diene backbone (urethane backbone/diene backbone) of (0.5/99.5) to (50/50).

4. The rubber composition according to claim 1, wherein the diene backbone segment in the polymer (A) contains a conjugated diene.

5. The rubber composition according to claim 4, wherein the diene backbone segment in the polymer (A) has a structure represented by the following formula 2:

wherein A represents a hydrocarbon group which may have an element other than carbon and hydrogen, x represents 1 to 13500, y represents 1 to 250, z represents 1 to 250, and x and y are independent of each other for every segment.

7. The rubber composition according to claim 1, wherein the polymer (A) has a number average molecular weight Mn of 2000 to 1350000, a weight average molecular weight Mw of 2000 to 2300000, and a molecular weight distribution MWD of 1.0 to 2.4.

8. The rubber composition according to claim 1, wherein the diene rubber contains a polybutadiene rubber.

9. The rubber composition according to claim 1, wherein the polymer (A) is produced from a first step of synthesizing the urethane backbone segment, a second step of synthesizing the diene backbone segment, and a third step of forming the copolymer by a polymer scrambling reaction of the urethane backbone segment and the diene backbone segment, and wherein the degree of exchange in the polymer scrambling reaction is less than 80 mol %.

10. A tire using the rubber composition according to claim 1.

11. The rubber composition according to claim 2, wherein the polymer (A) has a molar ratio of the urethane backbone to the diene backbone (urethane backbone/diene backbone) of (0.5/99.5) to (50/50).

12. The rubber composition according to claim 2, wherein the urethane backbone segment in the polymer (A) has a structure represented by the following formula 1:

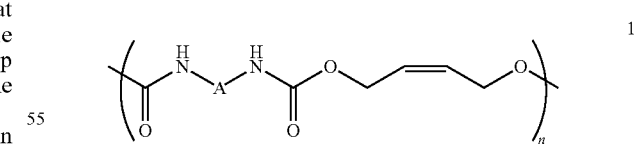

wherein A represents a hydrocarbon group which may have an element other than carbon and hydrogen, and n represents 10 to 500.

13. The rubber composition according to claim 2, wherein the diene backbone segment in the polymer (A) contains a conjugated diene.

14. The rubber composition according to claim 2, wherein the polymer (A) has a structure represented by the following formula 3:

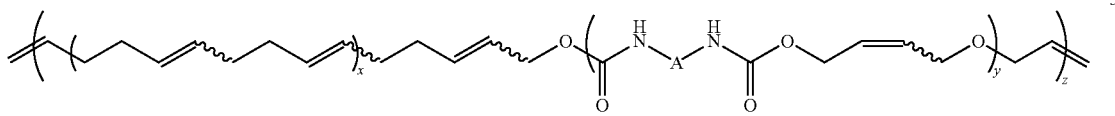

wherein A represents a hydrocarbon group which may have an element other than carbon and hydrogen, x represents 1 to 13500, y represents 1 to 250, z represents 1 to 250, and x and y are independent of each other for every segment.

15. The rubber composition according to claim 2, wherein the polymer (A) has a number average molecular weight Mn of 2000 to 1350000, a weight average molecular weight Mw of 2000 to 2300000, and a molecular weight distribution MWD of 1.0 to 2.4.

16. The rubber composition according to claim 2, wherein the diene rubber contains a polybutadiene rubber.

17. The rubber composition according to claim 3, wherein the urethane backbone segment in the polymer (A) has a structure represented by the following formula 1:

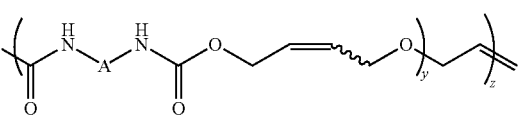

wherein A represents a hydrocarbon group which may have an element other than carbon and hydrogen, and n represents 10 to 500.

18. The rubber composition according to claim 3, wherein the diene backbone segment in the polymer (A) contains a conjugated diene.

19. The rubber composition according to claim 3, wherein the polymer (A) has a structure represented by the following formula 3:

wherein A represents a hydrocarbon group which may have an element other than carbon and hydrogen, x represents 1 to 13500, y represents 1 to 250, z represents 1 to 250, and x and y are independent of each other for every segment.

* * * * *